UNITED STATES PATENT OFFICE.

HOOPER B. STRAUT, OF LINCOLN, NEBRASKA, ASSIGNOR OF ONE-FOURTH TO J. W. HITCHCOCK, OF SAME PLACE.

WELDING COMPOUND.

SPECIFICATION forming part of Letters Patent No. 475,355, dated May 24, 1892.

Application filed August 31, 1891. Serial No. 404,268. (No specimens.)

*To all whom it may concern:*

Be it known that I, HOOPER B. STRAUT, a citizen of the United States, residing at Lincoln, in the county of Lancaster and State of Nebraska, have invented certain new and useful Improvements in Welding Compounds; and I do declare the following to be a full, clear, and exact description of the invention, such as will enable others skilled in the art to which it appertains to make and use the same.

My invention relates to welding compounds, and has for its object the production of an efficient welding compound adapted to the use of blacksmiths and other metal workers; and it consists in a composition of ingredients combined as hereinafter described. It is a well-known fact to those skilled in the art of metallurgy that some such expedient must be resorted to in order to effect a successful union or joining of two pieces of metal by the operation of welding, said operation consisting in a joining so complete as to unite the two parts as one homogeneous mass, the main function of a compound such as mine being to cleanse the abutting parts to be welded by eating the surface thereof.

My compound consists of ingredients which I prefer to combine as follows: borax, one pound; tripoli, one pound; muriate of ammonia, four ounces; prussiate of potassa, one ounce; soda-ash, five ounces; white sand, five ounces; soft water, one quart. Cook same to a thick paste and when cool pulverize.

The above proportions have been demonstrated as the most advantageous and effective, though some variations may be permitted without materially changing the nature thereof.

Having thus described my invention, what I claim is—

A welding compound consisting in the combination of borax, one pound; tripoli, one pound; muriate of ammonia, four ounces; prussiate of potassa, one ounce; soda-ash, five ounces; white sand, five ounces; soft water, one quart, substantially as described.

In testimony whereof I affix my signature in the presence of two witnesses.

HOOPER B. STRAUT.

Witnesses:
GEO. W. PECK,
C. B. FOX.